US012141988B2

United States Patent
Park (10) Patent No.: US 12,141,988 B2
(45) Date of Patent: Nov. 12, 2024

(54) CONTOUR-BASED PRIVACY MASKING APPARATUS, CONTOUR-BASED PRIVACY UNMASKING APPARATUS, AND METHOD FOR SHARING PRIVACY MASKING REGION DESCRIPTOR

(71) Applicant: ELECTRONICS AND TELECOMMUNICATIONS RESEARCH INSTITUTE, Daejeon (KR)

(72) Inventor: So-Hee Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 414 days.

(21) Appl. No.: 17/508,882

(22) Filed: Oct. 22, 2021

(65) Prior Publication Data
US 2022/0189036 A1 Jun. 16, 2022

(30) Foreign Application Priority Data
Dec. 11, 2020 (KR) .................. 10-2020-0173671

(51) Int. Cl.
*G06T 7/149* (2017.01)
*G06T 5/20* (2006.01)
(Continued)

(52) U.S. Cl.
CPC ............... *G06T 7/149* (2017.01); *G06T 5/20* (2013.01); *G06T 5/70* (2024.01); *G06T 7/11* (2017.01);
(Continued)

(58) Field of Classification Search
CPC . G06T 7/149; G06T 7/11; G06T 7/194; G06T 7/13; G06T 7/564; G06T 5/20;
(Continued)

(56) References Cited

U.S. PATENT DOCUMENTS 8,666,110 B2    3/2014    Yoo et al.
10,062,406 B2    8/2018    Park et al.
(Continued)

FOREIGN PATENT DOCUMENTS

KR    10-2011-0070735 A    6/2011
KR    10-2014-0031758 A    3/2014
(Continued)

OTHER PUBLICATIONS

Jolfaei et al., A Secure Lightweight Texture Encryption Scheme, 2016, Conference Paper and Lecture Notes, LNCS 9555, 344-356. (Year: 2016).*
(Continued)

*Primary Examiner* — Aaron W Carter
*Assistant Examiner* — Kathleen M Broughton
(74) *Attorney, Agent, or Firm* — LRK PATENT LAW FIRM

(57) ABSTRACT

Disclosed herein are a contour-based privacy region masking apparatus and method. The contour-based privacy region masking apparatus includes a memory for storing at least one program, and a processor for executing the program, wherein the program may perform detecting a contour of an object that is a privacy protection target in an original image, setting a masking region based on the detected contour, and de-identifying the masking region in the original image.

20 Claims, 8 Drawing Sheets

(A) RECTANGLE-BASED DE-IDENTIFIED IMAGE (B) CONTOUR-BASED DE-IDENTIFIED IMAGE (51) Int. Cl.
*G06T 5/70* (2024.01)
*G06T 7/11* (2017.01)
*G06T 7/194* (2017.01)
*G06T 7/564* (2017.01)
*G06T 9/00* (2006.01)

(52) U.S. Cl.
CPC .............. *G06T 7/194* (2017.01); *G06T 7/564* (2017.01); *G06T 9/005* (2013.01)

(58) Field of Classification Search
CPC .. G06T 5/70; G06T 5/75; G06T 9/005; G06T 2207/10016; G06T 2207/30196; G06T 2207/30232; H04N 19/20; H04N 19/21; H04N 21/4318; G06F 21/6245
See application file for complete search history.

(56) References Cited

U.S. PATENT DOCUMENTS

| | | | | |
|---|---|---|---|---|
| 2011/0158470 | A1* | 6/2011 | Martin | H04N 19/20 382/100 |
| 2013/0108105 | A1* | 5/2013 | Yoo | H04N 5/275 382/103 |
| 2014/0023248 | A1* | 1/2014 | Yoo | G08B 13/19686 382/118 |
| 2014/0068511 | A1 | 3/2014 | Bae et al. | |
| 2016/0086022 | A1* | 3/2016 | Johnson | G06F 16/50 382/118 |
| 2020/0250341 | A1 | 8/2020 | Yim et al. | |
| 2020/0293767 | A1 | 9/2020 | Choi et al. | |
| 2023/0229805 | A1* | 7/2023 | Burceanu | G06T 7/11 726/26 |

FOREIGN PATENT DOCUMENTS

| | | | | |
|---|---|---|---|---|
| KR | 10-2016-0066068 A | | 6/2016 | |
| KR | 10-2018-0099327 A | | 9/2018 | |
| KR | 20180099327 A | * | 9/2018 | ....... H04N 21/44055 |
| KR | 10-1928858 B1 | | 12/2018 | |
| KR | 20190085225 A | * | 7/2019 | .......... G06K 9/3233 |
| KR | 10-2100582 B1 | | 4/2020 | |
| WO | WO-2020130309 A1 | * | 6/2020 | ............... G06T 3/40 |

OTHER PUBLICATIONS

Khelifi et al., Secure and privacy-preserving data sharing in the cloud based on lossless image coding, 2018, Signal Processing, 148 (2018) 91-101. (Year: 2018).*

Elezovikj et al., Foreground and scene structure preserved visual privacy protection using depth information, 2013 IEEE Intl. Conf. on Multimedia and Expo Workshops, pp. 1-5. (Year: 2013).*

Wang et al., Face Obscuration in a Video Sequence by Integrating Kernel-Based Mean-Shift and Active Contour, 2008, 10th Intl. Conf. on Control, Automation, Robotics and Vision, pp. 1-5 (Year: 2008).*

* cited by examiner

CONTOUR-BASED PRIVACY MASKING APPARATUS, CONTOUR-BASED PRIVACY UNMASKING APPARATUS, AND METHOD FOR SHARING PRIVACY MASKING REGION DESCRIPTOR

CROSS REFERENCE TO RELATED APPLICATION

This application claims the benefit of Korean Patent Application No. 10-2020-0173671, filed Dec. 11, 2020, which is hereby incorporated by reference in its entirety into this application.

BACKGROUND OF THE INVENTION

1. Technical Field

The following embodiments relate generally to image-processing technology, and more particularly to technology for masking a privacy region that requires protection of personal information.

2. Description of Related Art

With the propagation of Artificial Intelligence (AI), research into and development of technology using images has been expanded, and thus the usage and value of images have gradually increased. The utilization of this image data premises collection of large-scale image data from various imaging devices such as a Closed Circuit Television (CCTV), a smartphone, a vehicle's black box, and a drone, and identification information of each person may be occasionally included in image data collected from a wide range depending on the usage purpose of image data. A requirement for de-identification of personal information included in such widely utilized images has also increased.

Accordingly, privacy masking technology has been regarded as technology to be essentially provided for utilization of image data. Here, privacy masking technology is technology for detecting a privacy region enabling each person to be identified (e.g., a face, a vehicle license plate or the like) and converting the detected privacy region into a de-identifiable region.

Here, upon privacy masking, in order to preserve the value of a masked image and process criminal investigation, privacy masking technology that enables original image reconstruction is required. That is, in order to provide privacy masking service that enables reconstruction of an original image, a masking apparatus for de-identifying the original image and an unmasking apparatus for reconstructing a masked image must be able to share masking region information with each other.

However, conventional technology is configured such that a masking apparatus detects a privacy region in the original image using technology for detecting a rectangular or circular privacy region, such as in face detection technology or vehicle license plate technology, performs masking, configures masking region information in the form of metadata based on rectangular coordinate information (x, y, width, height) or circular coordinate information (x, y, r), and transmits the metadata to an unmasking apparatus, thus allowing the masking and unmasking apparatuses to share the masking region information.

This technology for setting a rectangular or circular masking region is relatively simply implemented, but even pixel information in a region which does not require de-identification, other than the privacy region, is also masked.

Because this technology may cause loss of even pixel information in the region which is usable in an image and which does not require de-identification, and may then deteriorate the value of the image, there is required technology for detecting an accurate contour-based privacy region and masking only pixels corresponding to the privacy region.

PRIOR ART DOCUMENTS

Patent Documents (Patent Document 1) Korean Patent No. 10-2100582

SUMMARY OF THE INVENTION

An embodiment is intended to prevent pixel information in the remaining region, other than a privacy region, from being unnecessarily lost when privacy masking is performed so as to protect personal information in an image.

An embodiment is intended to allow a masking apparatus and an unmasking apparatus that are logically or physically separated to efficiently share contour-based privacy region setting information with each other.

In accordance with an aspect, there is provided a contour-based privacy region masking apparatus, including memory for storing at least one program, and a processor for executing the program, wherein the program may perform detecting a contour of an object that is a privacy protection target in an original image, setting a masking region based on the detected contour, and de-identifying the masking region in the original image.

The setting a masking region may include separating the original image into a privacy region that requires de-identification and a background region that does not require de-identification based on the detected contour, and generating a mask map based on the privacy region and the background region.

The de-identifying may be configured to perform de-identification processing using a key image that is a random image in the original image based on the generated mask map.

The mask map may be configured such that a pixel value of the privacy region is set to '1' and a pixel value of the background region is set to '0', and the de-identifying may be configured to de-identify a pixel value of the original image corresponding to a pixel, a value of which is set to '1' in the mask map, using the key image, and use a pixel value of the original image corresponding to a pixel, a value of which is set to '0' in the mask map.

The program may further perform encoding a de-identified image, and transmitting an encoded de-identified image to a contour-based privacy region unmasking apparatus, wherein the transmitting may be configured to transmit a masking region descriptor, together with the encoded de-identified image, and the key image is transmitted together with the masking region descriptor, or shared in advance with the contour-based privacy region unmasking apparatus. The masking region descriptor may be encoded by compressing the mask map using a Run-Length Encoding (RLE)-based algorithm that is a data lossless compression method.

In accordance with another aspect, there is provided a contour-based privacy region unmasking apparatus, including memory for storing at least one program, and a processor for executing the program, wherein the program may perform decoding a de-identified image received from a contour-based privacy region masking apparatus, detecting masking region information corresponding to a decoded de-identified image, and reconstructing an original image from the de-identified image based on detected masking region information.

The program may further perform receiving a masking region descriptor, together with the de-identified image, and the detecting masking region information may include decoding the masking region descriptor using a Run-Length Encoding (RLE)-based algorithm that is a data lossless compression method, and generating a mask map based on a result of decoding.

The reconstructing may be configured to unmask a pixel value of the de-identified image corresponding to a pixel, a value of which is set to '1' in the mask map.

In the program, the reconstructing may be configured to unmask a pixel value of the de-identified image corresponding to a pixel, a value of which is set to '1' in the mask map, using a key image, and use a pixel value of the de-identified image corresponding to a pixel, a value of which is set to '0' in the mask map, and the key image may be received together with the masking region descriptor, or shared in advance with the contour-based privacy region masking apparatus.

In accordance with a further aspect, there is provided a contour-based privacy region masking method, including detecting a contour of an object that is a privacy protection target in an original image, setting a masking region based on the detected contour, and de-identifying the masking region in the original image.

The setting a masking region may include separating the original image into a privacy region that requires de-identification and a background region that does not require de-identification, and generating a mask map based on the privacy region and the background region.

The de-identifying may be configured to perform de-identification processing using a key image that is a random image in the original image based on the generated mask map.

Here, the mask map may configured such that a pixel value of the privacy region is set to '1' and a pixel value of the background region is set to '0', wherein the de-identifying may be configured to de-identify a pixel value of the original image corresponding to a pixel, a value of which is set to '1' in the mask map, using the key image, and use a pixel value of the original image corresponding to a pixel, a value of which is set to '0' in the mask map.

In accordance with yet another aspect, there is provided a method for sharing a privacy masking region descriptor, including setting a masking region of an object that is a privacy protection target in an original image, de-identifying the masking region in the original image, generating a masking region descriptor by compressing information in which the masking region is set, and transmitting the masking region descriptor, together with a de-identified image, to a contour-based privacy region unmasking apparatus.

The setting a masking region may include separating the original image into a privacy region that requires de-identification and a background region that does not require de-identification and generating a mask map based on the privacy region and the background region.

The masking region descriptor may be encoded by compressing the mask map using a Run-Length Encoding (RLE)-based algorithm that is a data lossless compression method.

The mask map may be configured such that a pixel value of the privacy region is set to '1' and a pixel value of the background region is set to '0'.

The setting a masking region may be configured to detect a contour of the object that is the privacy protection target in an original image and separate the original image into the privacy region and the background region based on the detected contour.

The de-identifying the masking region may be configured to de-identify a pixel value of the original image corresponding to a pixel, a value of which is set to '1' in the mask map, using a key image that is a random image, and use a pixel value of the original image corresponding to a pixel, a value of which is set to '0' in the mask map, and the key image is transmitted together with the masking region descriptor, or shared in advance with the contour-based privacy region unmasking apparatus.

The method may further include, by the contour-based privacy region unmasking apparatus having have received the de-identified image and the masking region descriptor, decoding the de-identified image, detecting masking region information by decoding the masking region descriptor corresponding to a decoded de-identified image, and reconstructing the original image from the de-identified image based on the detected masking region information.

Detecting the masking region information may include decoding the masking region descriptor using a Run-Length Encoding (RLE)-based algorithm that is a data lossless compression method, and generating a mask map based on a result of decoding.

The mask map may be generated by separating the de-identified image into a privacy region and a background region based on a contour of the object that is the privacy protection target.

The reconstructing may be configured to unmask a pixel value of the de-identified image corresponding to a pixel, a value of which is set to '1' in the mask map, using a key image that is a random image, and use a pixel value of the de-identified image corresponding to a pixel, a value of which is set to '0' in the mask map.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Advantages and features of the present invention and methods for achieving the same will be clarified with reference to embodiments described later in detail together with the accompanying drawings. However, the present invention is capable of being implemented in various forms, and is not limited to the embodiments described later, and these embodiments are provided so that this invention will be thorough and complete and will fully convey the scope of the present invention to those skilled in the art. The present invention should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present invention.

The terms used in the present specification are merely used to describe embodiments and are not intended to limit the present invention. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

Unless differently defined, all terms used in the present specification can be construed as having the same meanings as terms generally understood by those skilled in the art to which the present invention pertains. Further, terms defined in generally used dictionaries are not interpreted as having ideal or excessively formal meanings unless they are definitely defined in the present specification.

Hereinafter, an apparatus and method according to embodiments will be described in detail with reference to FIGS. 1 to 9.

Figure 1:
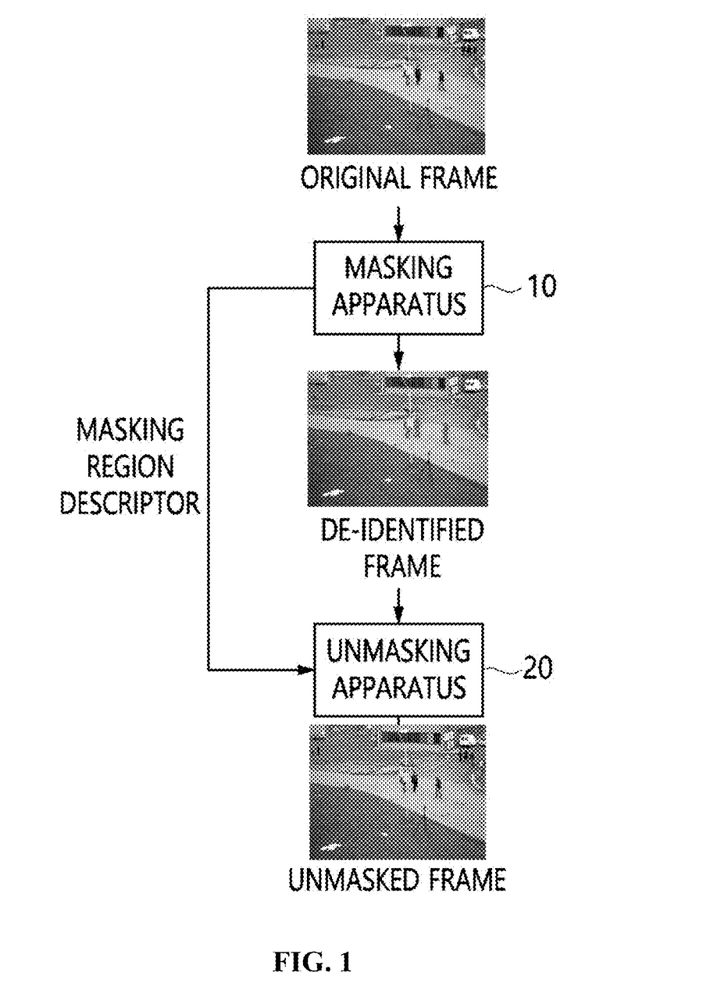
FIG. 1 is a schematic block diagram of a contour-based privacy masking system according to an embodiment.

FIG. 1 is a schematic block diagram illustrating a contour-based privacy masking system according to an embodiment.

Referring to FIG. 1, the contour-based privacy masking system may mainly include a masking apparatus 10 and an unmasking apparatus 20.

When an original image frame is received, the masking apparatus 10 de-identifies and outputs a privacy region in the original image frame.

Here, the privacy region may be a region including an object, such as a face or a vehicle license number that enables each individual to be identified in an input image.

In accordance with an embodiment, the privacy region may be extracted based on the contour of the object. The detailed description of operation of the masking apparatus 10 will be made later with reference to FIGS. 2 to 5.

Also, the masking apparatus 10 generates a masking region descriptor that is information about the de-identified privacy region, together with a de-identified frame, and transfers the masking region descriptor, together with the de-identified frame, to the unmasking apparatus 20.

Then, the unmasking apparatus 20 may unmask the privacy region of the de-identified frame based on the masking region descriptor received from the masking apparatus 10. The detailed description of operation of the unmasking apparatus 20 will be made with reference to FIGS. 6 to 8.

Figure 2:
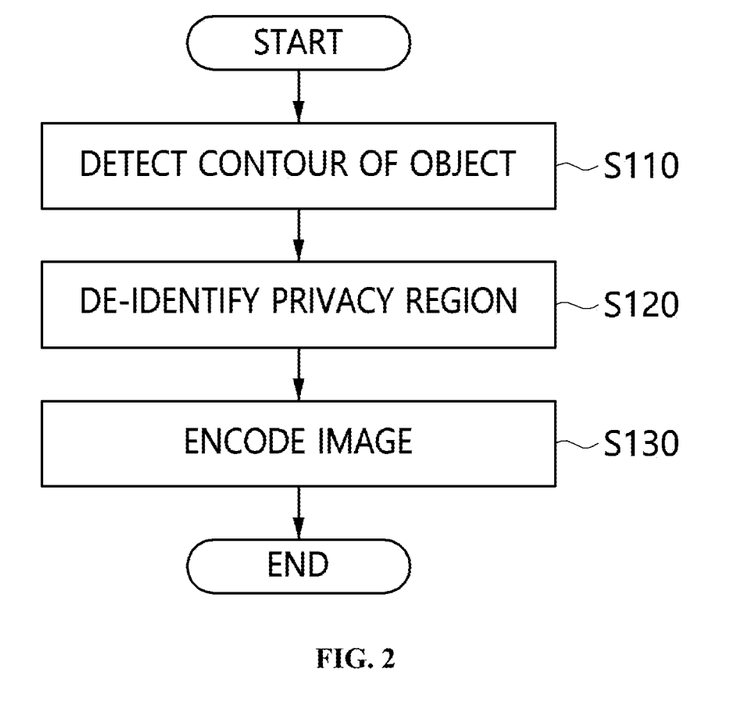
FIG. 2 is a flowchart illustrating a contour-based privacy masking method according to an embodiment.

FIG. 2 is a flowchart illustrating a contour-based privacy masking method according to an embodiment.

Referring to FIG. 2, the masking apparatus 10 detects the contour of an object that is a privacy protection target from an input original image at step S110.

Here, the input original image may be either an image captured in real time through a camera or an image that is previously captured and stored and is transmitted over a wired/wireless network. Further, the input original image may be a moving image (video) or a still image.

Thereafter, the masking apparatus 10 sets a masking region based on the detected contour information and de-identifies only a portion set to the masking region in the original image at step S120. The detailed description thereof will be made with reference to FIGS. 3 and 4.

The masking apparatus 10 encodes the input image on which de-identification has been processed (i.e., the de-identified image) at step S130. The de-identified image encoded in this way may be output via a display means (not illustrated) provided in the masking apparatus 10 or may be transmitted to and displayed via an external device over a wired/wireless network.

Further, for criminal investigation, the de-identified image may be transmitted to the unmasking apparatus 20. Here, the masking apparatus 10 may transmit the masking region descriptor of the de-identified image and a key image used for de-identification, together with the de-identified image. Further, the key image may be shared in advance between the masking apparatus 10 and the unmasking apparatus 20 using a secure method.

Figure 3:
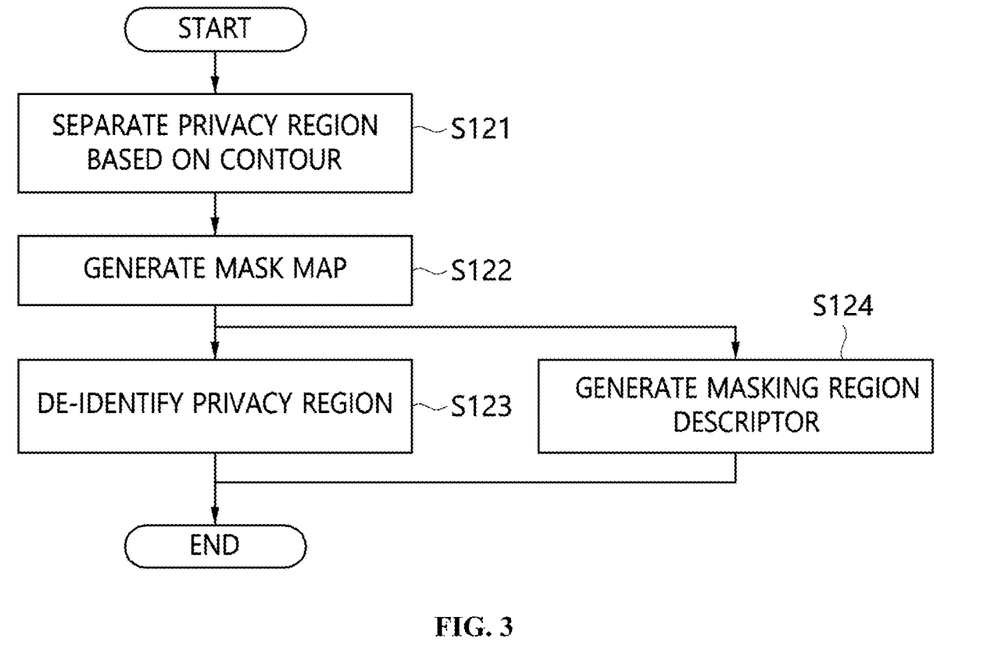
FIG. 3 is a flowchart illustrating the step of de-identifying a privacy region in FIG. 2.
Figure 4:
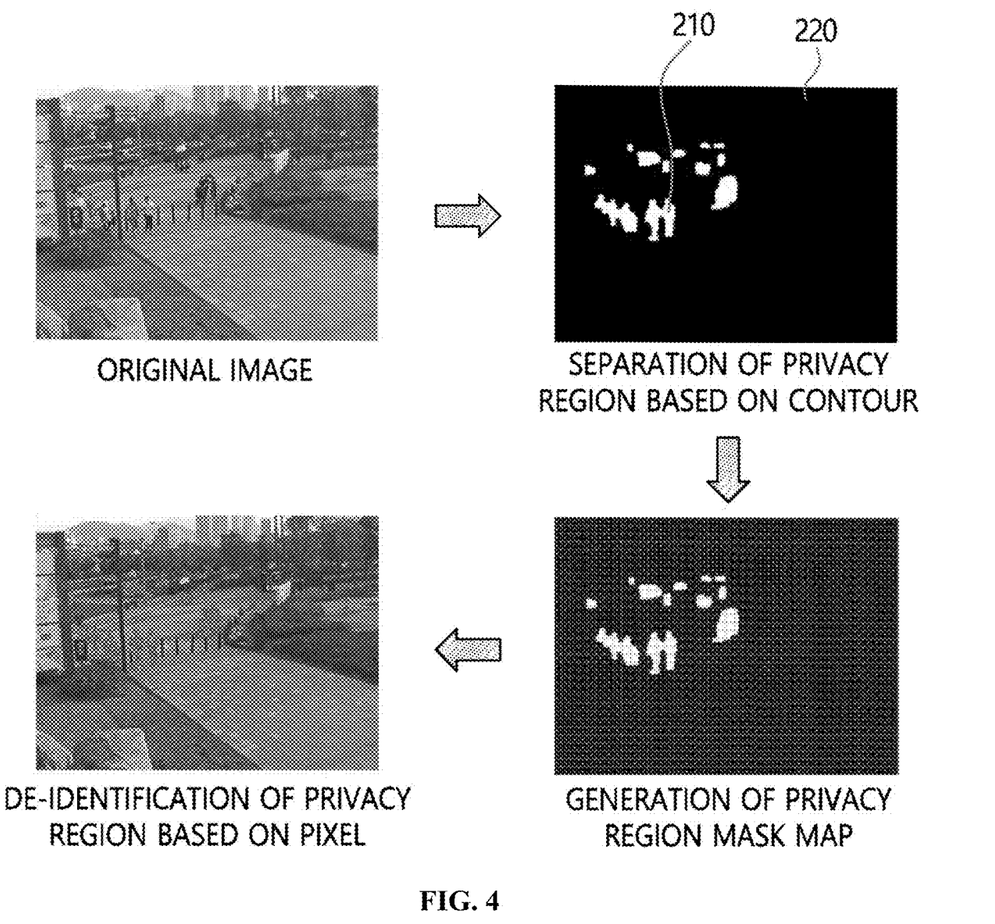
FIG. 4 is a diagram illustrating an example of de-identification of a privacy region in an original frame image according to an embodiment.

FIG. 3 is a flowchart illustrating the step S120 of de-identifying a privacy region in FIG. 2, and FIG. 4 is a diagram illustrating an example of de-identification of a privacy region in the original image according to an embodiment.

Referring to FIG. 3, the masking apparatus 10 separates the original image into a privacy region that requires de-identification and a background region that does not require de-identification based on the contour, detected at step S110, at step S121.

For example, referring to FIG. 4, the original image may be separated into a privacy region 210 and a background region 220 based on the contour of the target that requires privacy protection, such as a person.

The masking apparatus 10 generates a mask map having the same size as the input original image based on the separated information at step S122.

Here, as illustrated in FIG. 4, the mask map is generated on a pixel basis, in which case the value of each pixel corresponding to the privacy region requiring de-identification is set to '1' and the value of each pixel corresponding to the background region is set to '0'.

Then, the masking apparatus 10 de-identifies the privacy region in the image based on the generated mask map at step S123.

Here, in accordance with an embodiment, the privacy region is de-identified using a key image that is a random image having the same size as the input image.

That is, in the input image, the pixel set to '1' corresponding to the privacy region in the mask map, is masking-processed based on the key image using the following Equation (1):

$$D(i, j) = \begin{cases} I(i, j) \oplus K(i,j), & \text{if } M(i, j) = 1 \\ I(i, j), & \text{otherwise} \end{cases} \quad (1)$$

In Equation (1), I(i,j) is the value of a pixel at an i-th position in the X axis direction and a j-th position in the Y axis direction in the input image, K(i,j) is the value of a pixel at an i-th position in the X axis direction and a j-th position in the Y axis direction in the key image, M(i,j) is the value of a pixel at an i-th position in the X axis direction and a j-th position in the Y axis direction in the generated mask map, and D(i,j) is the value of a pixel at an i-th position in the X axis direction and a j-th position in the Y axis direction in the de-identified image.

That is, in the case of the pixel for which the value of M(i,j) is '1', D(i,j) is generated by performing de-identification using the input image I(i,j) and the key image K(i,j). Meanwhile, in the case of the pixel for which M(i,j) is '0', the input image I(i,j) becomes D(i,j) without change because de-identification is not performed.

Therefore, as illustrated in FIG. 4, a portion corresponding to the privacy region of the mask map in the de-identified image is fuzzy, and a portion corresponding to the background region remains as it is.

Meanwhile, the mask map must be transmitted from the masking apparatus 10 to the unmasking apparatus 20, in which case the transmission of the mask map having the same size as the input frame without change is inefficient from the standpoint of speed and memory consumption.

Therefore, in accordance with an embodiment, the masking apparatus 10 generates a masking region descriptor by encoding the mask map into the masking region descriptor by compressing the mask map using a data lossless compression method at step S124.

Here, in accordance with an embodiment, the mask map may be compressed using a Run-Length Encoding (RLE)-based algorithm, which is a simple lossless compression method, and may then be encoded into the masking region descriptor.

Table 1 illustrates an example of a pseudo code of an RLE-based encoding algorithm for generating the masking region descriptor.

TABLE 1

```
Loop: count=0
  REPEAT
    get next value
    count = count + 1
  UNTIL (value unequal to next one)
  output value
  IF count > 1
    output count
  GOTO loop
```

The RLE algorithm is a very simple lossless compression method, and the case where the same value consecutively appears in data is represented only by the repeated value and the number of times (count value) that the value appears.

Because this is effective in data in which a large number of consecutive values appear as in the case of a simple image, such an algorithm may be very suitable for the generation of a masking region descriptor due to the characteristics of the mask map when there are not too many small objects in an image frame.

Figure 5:
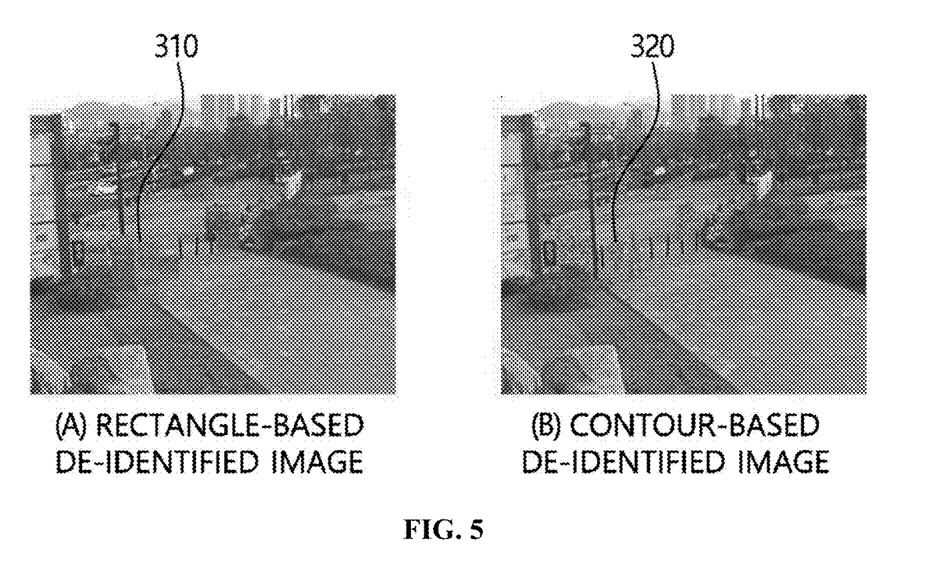
FIG. 5 is a diagram illustrating examples of the conventional case where a rectangle-based privacy region is masked and the case where a contour-based privacy region is masked according to an embodiment.

FIG. 5 is a diagram illustrating examples of the conventional case where a rectangle-based privacy region is masked and the case where a contour-based privacy region is masked according to an embodiment.

Referring to FIG. 5, it can be seen that, unlike in a rectangle-based de-identified image in (A), in a contour-based de-identified image in (B), unnecessary loss of pixel information is reduced.

Figure 6:
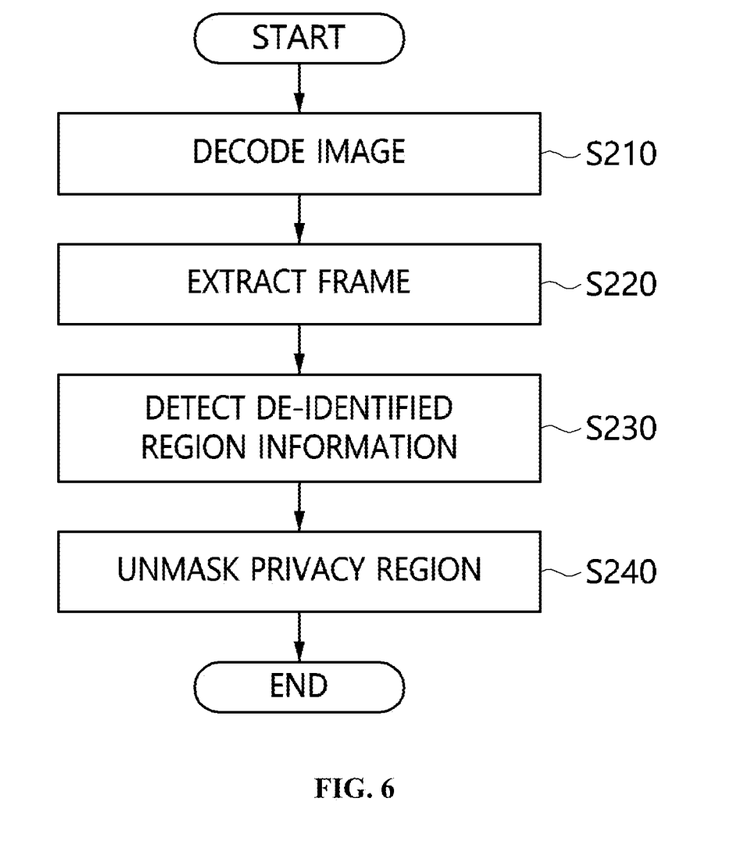
FIG. 6 is a flowchart illustrating a contour-based privacy unmasking method according to an embodiment.

FIG. 6 is a flowchart illustrating a contour-based privacy unmasking method according to an embodiment.

Referring to FIG. 6, the unmasking apparatus 20 decodes a received image at step S210, extracts a frame from the decoded image at step S220, and thereafter detects de-identified privacy region information that is information about each masked pixel from the image at step S230.

Here, when the received image is a moving image (video), privacy region information may be detected for each frame.

The unmasking apparatus 20 reconstructs the original image from all frames by unmasking each pixel in the privacy region based on the detected privacy region information at step S240.

Figure 7:
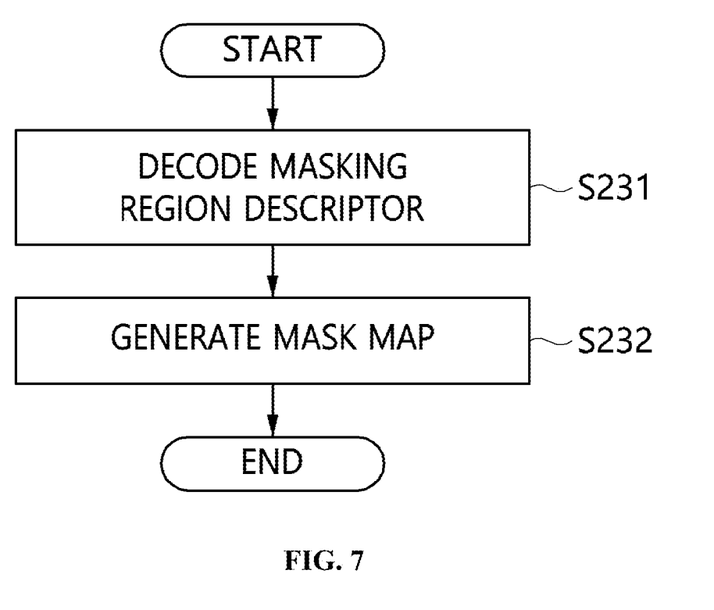
FIG. 7 is a flowchart illustrating the step of unmasking a de-identified privacy region in FIG. 6.
Figure 8:
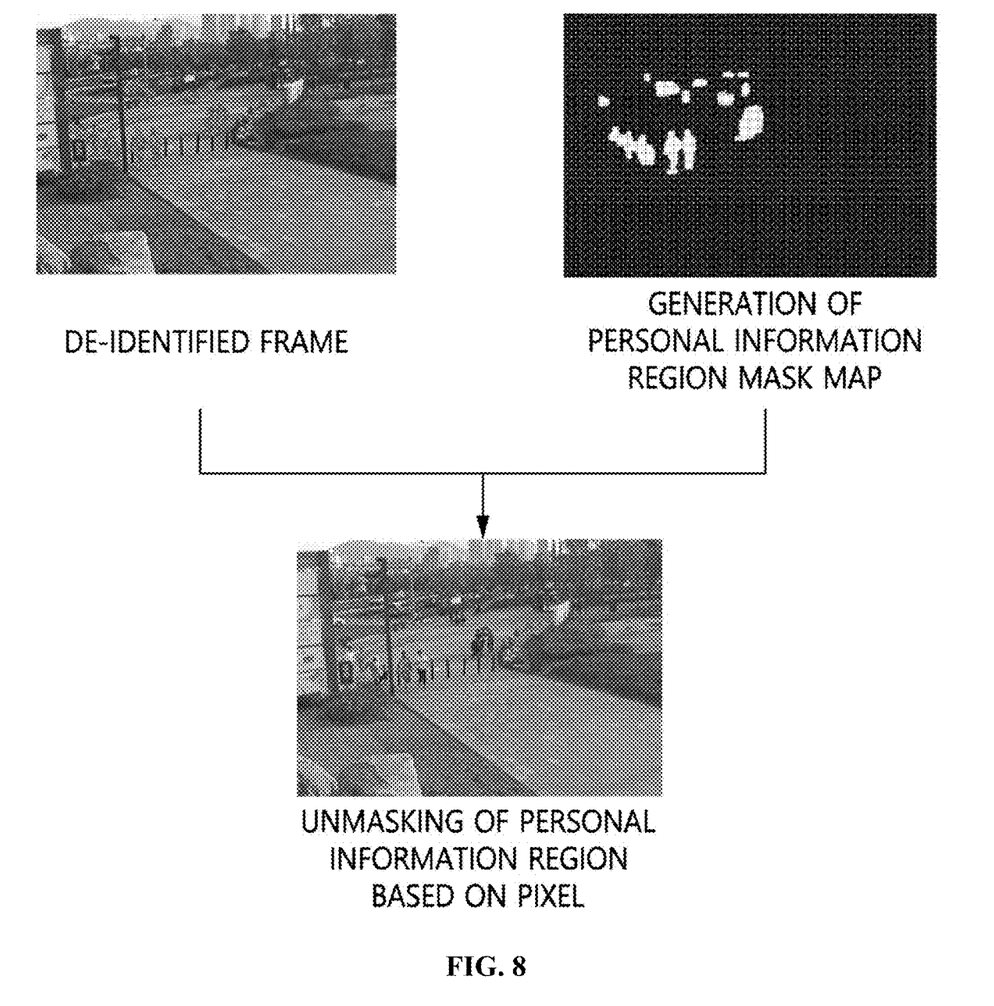
FIG. 8 is a diagram illustrating an example in which a privacy region in a de-identified image is unmasked.

FIG. 7 is a flowchart illustrating the step S240 of unmasking the de-identified privacy region in FIG. 6, and FIG. 8 is a diagram illustrating an example in which a privacy region in a de-identified image is unmasked.

Referring to FIG. 7, the unmasking apparatus 20 decodes a masking region descriptor received together with a masked frame at step S231.

Here, the masking region descriptor may be decoded based on RLE, and the following Table 2 shows an example of a pseudo code of an RLE-based decoding algorithm.

TABLE 2

```
Loop: count=0
  REPEAT
    get next value
    get next value count
  UNTIL(value is NULL)
  REPEAT
    IF count > 1
      output value
      count = count - 1
  UNTIL (count is 0)
  GOTO loop
```

Thereafter, the unmasking apparatus 20 generates a mask map using the decoded masking region descriptor at step S232. That is, a personal information region mask map such as that shown in FIG. 8 is generated using the decoded masking region descriptor.

Referring back to FIG. 6, the unmasking apparatus 20 unmasks only the privacy region, for which pixel values are set to '1' in the generated mask map, using the following Equation (2) at step S240.

$$R(i, j) = \begin{cases} D(i, j) \oplus K(i,j), & \text{if } M(i, j) = 1 \\ D(i, j), & \text{otherwise} \end{cases} \quad (2)$$

In Equation (2), D(i,j) is the value of a pixel at an i-th position in the X axis direction and a j-th position in the Y axis direction in a masked image (i.e., a de-identified image), K(i,j) is the value of a pixel at an i-th position in the X axis direction and a j-th position in the Y axis direction in a key image used in a pixel-based masking algorithm, M(i,j) is the value of a pixel at an i-th position in the X axis direction and a j-th position in the Y axis direction in the generated mask map image, and R(i,j) denotes the value of a pixel at an i-th position in the X axis direction and a j-th position in the Y axis direction in the reconstructed image.

That is, in the case of each pixel, for which M(i,j) is '1', R(i,j) may be generated by performing unmasking (identification) using the masked image D(i,j) and the key image K(i,j), and in the case of the remaining pixels, D(i,j) becomes R(i,j) without change because unmasking is not performed.

Referring to FIG. 8, an image in which the privacy region is unmasked from the de-identified frame based on the mask map is generated.

Figure 9:
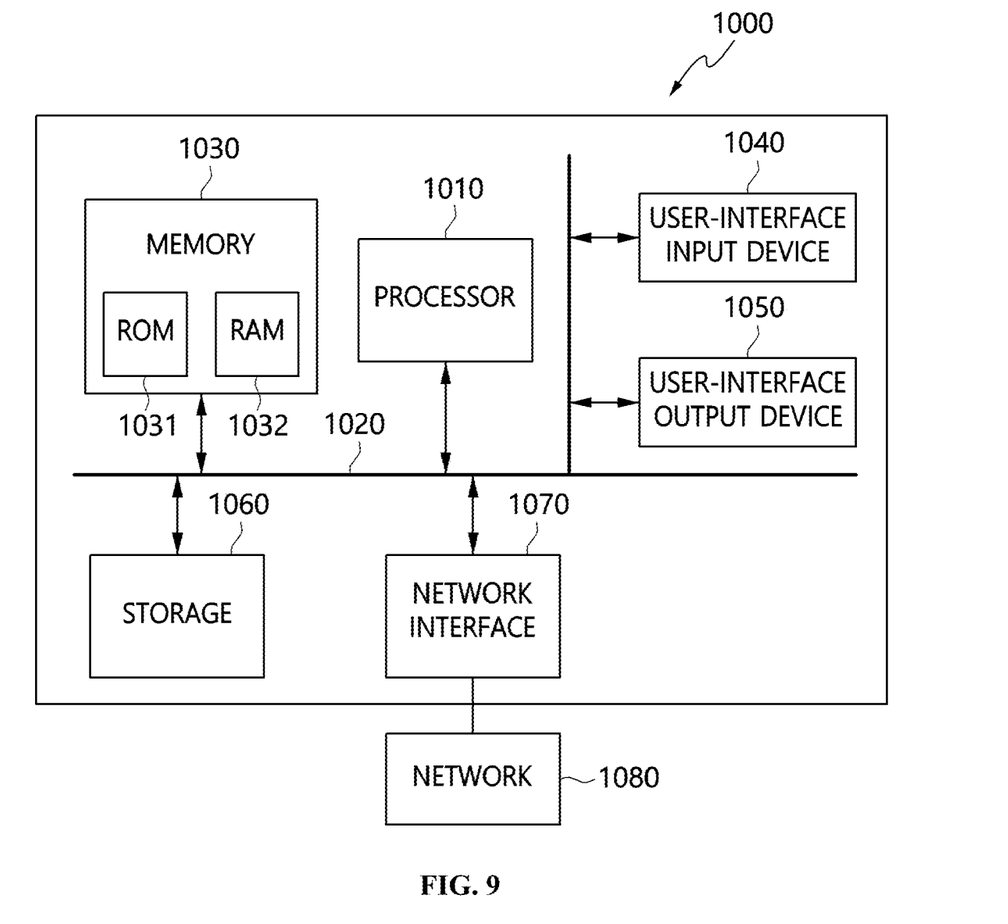
FIG. 9 is a diagram illustrating the configuration of a computer system according to an embodiment.

FIG. 9 is a diagram illustrating the configuration of a computer system according to an embodiment.

Each of the contour-based privacy masking apparatus 10 and the contour-based privacy unmasking apparatus 20 according to embodiments may be implemented in a computer system 1000 such as a computer-readable storage medium.

The computer system 1000 may include one or more processors 1010, memory 1030, a user interface input device 1040, a user interface output device 1050, and storage 1060, which communicate with each other through a bus 1020. The computer system 1000 may further include a network interface 1070 connected to a network 1080. Each processor 1010 may be a Central Processing Unit (CPU) or a semiconductor device for executing programs or processing instructions stored in the memory 1030 or the storage 1060. Each of the memory 1030 and the storage 1060 may be a storage medium including at least one of a volatile medium, a nonvolatile medium, a removable medium, a non-removable medium, a communication medium, or an information delivery medium. For example, the memory 1030 may include Read-Only Memory (ROM) 1031 or Random Access Memory (RAM) 1032.

In accordance with an embodiment, only an accurate privacy region is masked when an image privacy masking service that enables reconstruction of the original image is provided, so that occurrence of unnecessary loss of pixel information that does not require de-identification may be prevented, with the result that a differentiated privacy masking service that does not deteriorate the value of an image may be provided.

In accordance with an embodiment, a masking apparatus and an unmasking apparatus that are logically or physically separated may efficiently share contour-based privacy region setting information with each other.

Although the embodiments of the present invention have been disclosed with reference to the attached drawing, those skilled in the art will appreciate that the present invention can be implemented in other concrete forms, without changing the technical spirit or essential features of the invention. Therefore, it should be understood that the foregoing embodiments are merely exemplary, rather than restrictive in all aspects.

What is claimed is:

1. A contour-based privacy region masking apparatus, comprising:
    a memory for storing at least one program; and
    a processor for executing the program,
    wherein the program performs:
    detecting a contour of an object that is a privacy protection target in an original image;
    setting a mask map with separate privacy and background regions based on the detected contour; and
    de-identifying the pixel value of the original image corresponding to the privacy region in the mask map using a key image of the same size as the original image.

2. The contour-based privacy region masking apparatus of claim 1, wherein the setting comprises:
    separating the original image into a privacy region that requires de-identification and a background region that does not require de-identification based on the detected contour; and
    generating a mask map where the privacy region and the background region are each set to different pixel values.

3. The contour-based privacy region masking apparatus of claim 2, wherein the de-identifying is configured to de-identify the pixel value of the original image corresponding to the pixel whose value is set as the privacy region using the key image, and use the pixel value of the original image corresponding to the pixel whose value is set as the background region.

4. The contour-based privacy region masking apparatus of claim 3, wherein:
    the mask map is configured such that a pixel value of the privacy region is set to '1' and a pixel value of the background region is set to '0', and
    the de-identifying is configured to:
    de-identify a pixel value of the original image corresponding to a pixel, a value of which is set to '1' in the mask map, using the key image, and
    use a pixel value of the original image corresponding to a pixel, a value of which is set to '0' in the mask map.

5. The contour-based privacy region masking apparatus of claim 2, wherein:
    the program further performs:
    encoding a de-identified image; and
    transmitting an encoded de-identified image to a contour-based privacy region unmasking apparatus,
    the transmitting is configured to transmit a masking region descriptor, together with the encoded de-identified image, and
    the key image is transmitted together with the masking region descriptor, or shared in advance with the contour-based privacy region unmasking apparatus.

6. The contour-based privacy region masking apparatus of claim 5, wherein the masking region descriptor is encoded by compressing the mask map using an algorithm that is a data lossless compression method.

7. A contour-based privacy region unmasking apparatus, comprising:
    a memory for storing at least one program; and
    a processor for executing the program,
    wherein the program performs:
    reconstructing an original image from the de-identified image;
    using a mask map that separates a privacy region and a background region based on a contour of an object that is a privacy protection target and a key image of the same size as the original image,
    reconstructing the pixel value of the original image corresponding to the privacy region in the mask map using the key image.

8. The contour-based privacy region unmasking apparatus of claim 7, wherein the program further performs:
    decoding the de-identified image and a masking region descriptor received from a contour-based privacy region masking apparatus; and
    detecting masking region information corresponding to a decoded de-identified image, and
    wherein the detecting comprises:
    decoding the masking region descriptor using an algorithm that is a data lossless compression method; and
    generating a mask map based on a result of decoding.

9. The contour-based privacy region unmasking apparatus of claim 7, wherein the mask map includes the privacy region and the background region, each set to different pixel values, wherein the program performs:

reconstructing a pixel value of the de-identified image corresponding to a pixel, a value of which is set to the privacy region in the mask map using the key image; and using the pixel value of the de-identified image corresponding to the pixel whose value is set as the background region.

10. The contour-based privacy region unmasking apparatus of claim 9, wherein, in the program, the reconstructing is configured to:

unmask a pixel value of the de-identified image corresponding to a pixel, a value of which is set to '1' in the mask map, using a key image, and use a pixel value of the de-identified image corresponding to a pixel, a value of which is set to '0' in the mask map, and the key image is received together with the masking region descriptor, or shared in advance with the contour-based privacy region masking apparatus.

11. A method for sharing a privacy masking region descriptor, comprising:

setting a mask map with separate privacy and background regions based on a contour of an object that is a privacy protection target in an original image;

de-identifying the pixel value of the original image corresponding to the privacy region in the mask map using a key image of the same size as the original image;

generating a masking region descriptor by compressing information in which the masking map is set; and transmitting the masking region descriptor, together with a de-identified image, to a contour-based privacy region unmasking apparatus.

12. The method of claim 11, wherein the setting comprises:

separating the original image into a privacy region that requires de-identification and a background region that does not require de-identification; and generating a mask map where the privacy region and the background region are each set to different pixel values.

13. The method of claim 11, wherein the masking region descriptor is encoded by compressing the mask map using a Run-Length Encoding (RLE)-based algorithm that is a data lossless compression method.

14. The method of claim 12, wherein the mask map is configured such that a pixel value of the privacy region is set to '1' and a pixel value of the background region is set to '0'.

15. The method of claim 12, wherein the de-identifying is configured to de-identify the pixel value of the original image corresponding to the pixel whose value is set as the privacy region using the key image, and use the pixel value of the original image corresponding to the pixel whose value is set as the background region.

16. The method of claim 14, wherein:

the de-identifying is configured to:

de-identify a pixel value of the original image corresponding to a pixel, a value of which is set to '1' in the mask map, using a key image that is a random image, and use a pixel value of the original image corresponding to a pixel, a value of which is set to '0' in the mask map, and the key image is transmitted together with the masking region descriptor, or shared in advance with the contour-based privacy region unmasking apparatus.

17. The method of claim 11, further comprising:

by the contour-based privacy region unmasking apparatus having have received the de-identified image and the masking region descriptor, decoding the de-identified image;

detecting the masking map by decoding the masking region descriptor corresponding to a decoded de-identified image; and reconstructing the original image from the de-identified image based on the detected masking map and the key image.

18. The method of claim 17, wherein detecting the masking region information comprises:

decoding the masking region descriptor using an algorithm that is a data lossless compression method; and generating a mask map based on a result of decoding.

19. The method of claim 18, wherein the mask map includes the privacy region and the background region, each set to different pixel values, wherein the program performs:

reconstructing a pixel value of the de-identified image corresponding to a pixel, a value of which is set to the privacy region in the mask map using the key image, using the pixel value of the de-identified image corresponding to the pixel whose value is set as the background region.

20. The method of claim 17, wherein the reconstructing is configured to:

unmask a pixel value of the de-identified image corresponding to a pixel, a value of which is set to '1' in the mask map, using a key image that is a random image, and use a pixel value of the de-identified image corresponding to a pixel, a value of which is set to '0' in the mask map.

* * * * *